United States Patent [19]
Hendler et al.

[11] Patent Number: 6,071,545
[45] Date of Patent: Jun. 6, 2000

[54] METALLIC OLIGOPEPTIDE COMPLEXES

[75] Inventors: Sheldon S. Hendler, La Jolla; Dusan Miljkovic, San Diego, both of Calif.; Robert Sanchez, Riverton, Utah

[73] Assignee: Vyrex Corporation, La Jolla, Calif.

[21] Appl. No.: 09/243,762

[22] Filed: Feb. 3, 1999

[51] Int. Cl.[7] .............................. A23L 1/304; A23L 1/305
[52] U.S. Cl. .............................................. 426/74; 426/656
[58] Field of Search ....................................... 426/74, 656

[56] References Cited

U.S. PATENT DOCUMENTS

| | | | |
|---|---|---|---|
| 4,684,528 | 8/1987 | Godfrey | 426/74 |
| 4,948,594 | 8/1990 | Abdel-Monem et al. | 426/74 |
| 5,292,538 | 3/1994 | Paul et al. | 426/74 |

OTHER PUBLICATIONS

Olson et al., Modern Nutrition in Health and Disease, 9th Ed., Wilkins Publ. Baltimore, MD (1999), p. 14.
Houdjik et al., Randomized trial of gluamine–enriched enteral nutrition on infectious morbidity in patients with multiple trauma, Lancet 352: 772–776 (1998).
Wernerman, J. Documentation of clinical benefit of specific amino acid nutrients, Lancet 352:756–757 (1998).
Morlion et al., Total parenteral nutrition with glutamine dipeptide after major abdominal surgery: a randomized, double blind, controlled study, Ann. surg. 227:302–308 (1998).
Baldwin, E. Dynamic Aspects of Biochemistry, 4th Ed., Cambridge at the University Press (1963), pp. 126–128, 129, 316, 317, 321.
Lehninger et al., Principles of Biochemistry, 2nd Ed., Worth Publishers (1993), pp. 652–692, 717, 718.
Corrigan, J.J. D–Amino Acids in animals, Science 169:142–148 (1969).
Guide to Clinical Trials, Chap. 8, pp. 675–683, Extrapolation of Safety (i.e. Toxicological) Data from Animal to Human, Bert Spilker, Ravens Press, 1991.
Hasler, C. Functional Foods: the Western Perspective, Nutritional Reviews 54:S60S10 (1996).

Primary Examiner—Helen Pratt
Attorney, Agent, or Firm—The Brotman Group; Harris F. Brotman

[57] ABSTRACT

A composition of matter which comprises a metallic complex of the formula $$M^{Z+}L_n \qquad \text{I}$$

wherein
M is a metal ion of nutritional or therapeutic value;
$L_n$ is one or more oligopeptides wherein at least one oligopeptide comprises at least one amino acid selected from the group consisting of nonprotein amino acids and synthetic amino acids;
n=1–3,
Z=1–6. The metal ion of the metallic complex is selected from the group consisting of chromium, zinc, manganese, magnesium, calcium, copper, iron, vanadium, cobalt, molybdenum, germanium, selenium, and indium. The invention further provides food or drink compositions or dietary supplements which comprise the metallic complex of the invention.

21 Claims, No Drawings

METALLIC OLIGOPEPTIDE COMPLEXES

FIELD OF THE INVENTION

This invention relates to metallic complexes as nutritional supplements. In particular, the invention is directed to metals of nutritional or therapeutic value in mixed complexes of oligopeptides which contain at least one oligopeptide comprising a synthetic amino acid or nonprotein amino acid.

DESCRIPTION OF RELATED ART

The importance of certain metals and metalloids in diet is well recognized. Known as dietary essential metals or metalloids, they include chromium, zinc, manganese, magnesium, calcium, copper, iron, boron, and vanadium, molybdenum, germanium and selenium. (*Modern Nutrition in Health and Disease,* Ninth ed., edited by Olson, J. A., Shike, M., and Ross, A. C., Williams and Wilkins Publ., Baltimore, Md., 1999; *The Doctors' Vitamin and Mineral Encyclopedia,* Sheldon S. Hendler, Simon and Schuster, Publ., New York, 1990). They are known to have nutritional or therapeutic value to animals, including humans, in which they promote, maintain and support health and tissues. Other metals or metalloids of similar value to animals and possibly to humans include nickel, vanadium, silicon, germanium, arsenic, aluminum, cadmium, lead, lithium, tin, cobalt and rubidium.

An animal or human deficient in chromium, for example, shows a decreased ability to remove sugar from the blood for cellular nourishment, a condition known as glucose intolerance, and characteristic of diabetes. When glucose intolerant animals are fed trivalent chromium in the form of an organic substance commonly referred to as glucose tolerance factor, glucose intolerance is often corrected.

Metallic nutritional supplements can correct impaired metabolic conditions in malnourished children. Recent studies indicate that many Americans, of all ages, get amounts of essential metals in their daily diets that are below the minimum safe and adequate allowance. Typically only a small amount of the actual essential metal intake in a typical U.S. diet is actually absorbed. Barriers to absorption are presented by mammalian intestine membranes and resident proteins which bind essential metal ions, preventing or inhibiting the passage of metal ions from the lumen of the intestine into blood.

There is increasing evidence that marginal essential metal deficiency is commonplace, and is likely the result of improper dietary intake and inefficient or poor absorption through the intestinal membrane barrier. Accordingly, essential metal nutritional supplementation is an important factor in nutritional approaches to maintaining health.

Supplementation with amino acids is also an important factor in nutritional approaches to maintaining health. L-glutamine, for example, has been found to be beneficial in patients with multiple trauma, in patients receiving bone-marrow transplants, in children undergoing intensive chemotherapy; and is know to maintain intestinal integrity in patients on parenteral nutrition. A recent study showed a low frequency of pneumonia, sepsis and bacteremia in patients with multiple trauma who received glutamine-supplemented enteral nutrition (Houdjik et al., Randomized trial of glutamine-enriched enteral nutrition on infectious morbidity in patients with multiple trauma, *Lancet* 352:772–776, 1998). L-arginine and L-glutamine may improve various features of the immune system (Hendler, S. S., *The Doctors' Vitamin and Mineral Encyclopedia,* Simon and Schuster, New York, 1990; Wernerman, J., Documentation of clinical benefit of specific amino acid nutrients, *Lancet* 352:756–757, 1998). The branched-chain amino acids, L-leucine, L-isoleucine, and L-valine, are useful in treating patients with hepatic encephalopathy and may be helpful in the treatment of patients with amyotrophic lateral sclerosis (ALS or Lou Gehrig's disease). D-phenylalanine and DL-phenylalanine have been shown to have analgesic as well as anti-inflammatory effects in both animals and humans. L-tyrosine has been shown to enhance physical performance in stressful situations (Hendler, S. S., op cit and references herein). The dipeptides L-alanyl-L-glutamine and L-glycyl-L-glutamine are beneficial for the immune system and have been shown to shorten hospital stays in surgical patients (Morlion et al., Total parenteral nutrition with glutamine dipeptide after major abdominal surgery; a randomized, double blind, controlled study, *Ann. Surg* 227:302–308, 1998). The dipeptide carnosine, β-alanyl-L-histidine, has demonstrated antioxidant properties and is claimed to be beneficial in cancer treatment, wound healing, senile cataracts and as an immune system enhancer.

The present invention is directed to nutritional metals complexed with one or more oligopeptides.

DISCLOSURE OF THE INVENTION

The invention provides a composition of matter which comprises a metallic complex of the formula $$M^{Z+}L_n \qquad \text{I}$$

wherein M is a metal ion of nutritional or therapeutic value; $L_n$ is one or more oligopeptides, wherein at least one oligopeptide comprises at least one amino acid selected from the group consisting of synthetic amino acids and nonprotein amino acids;

n=1–3;

Z=1–6.

The metal ion of the metallic complex is selected from the group consisting of chromium, zinc, manganese, magnesium, calcium, copper, iron, cobalt, vanadium, molybdenum, germanium, selenium, and indium.

The synthetic or nonprotein amino acid(s) in L may be α, β-, γ-, or δ-amino acids. The amino group may be mono- or dialkylated, and the acid may be carboxylic, phosphoric, phosphonic, sulfuric or sulfonic.

An object of the invention is to provide a composition of matter which promotes, maintains and supports health and tissues when administered to mammals.

Another object of the invention is to provide food or drink compositions or dietary supplements which comprise the metallic complex of the invention which promote, maintain and support health and tissues when administered to mammals.

These and many other features and attendant advantages of the present invention will become better understood by reference to the following detailed description of the invention.

MODES OF THE INVENTION

General Description and Definitions

The practice of the present invention will employ, unless otherwise indicated, conventional biochemistry, synthetic organic chemistry, bioinorganic chemistry, analytical chemistry, nutritional chemistry and food chemistry techniques within the skill of the art. Such techniques are explained fully in the literature, as well as in the generally available college literature covering practical aspects of inorganic and organic chemical syntheses.

The following terminology will be used in accordance with the definitions set out below in describing the present invention.

The term "amino acid" as used herein means an organic acid containing both a basic amino group ($NR_2$ wherein R=hydrogen or alkyl) and an acid group. For purposes of this invention, the term "amino acids" encompasses (a) nonprotein natural amino acids and synthetic amino acids; (b) alpha, beta, gamma and delta amino acids; (c) aliphatic, aromatic, and heterocyclic amino acids. The amine group can be $—NH_2$—NHR, $—NR_2$, and —N=(aromatic/heterocyclic). The 'acid' group can be carboxylic, phosphoric, phosphonic, sulfuric or sulfonic. Any and all optical isomers, i.e. d- or l- or dl- of the above are included.

As used herein, the term "oligopeptide" means any molecule that contains a small number (2 to about 20) of amino acid residues connected by peptide linkage(s). The oligopeptides which comprise the compositions of matter of the present invention fall into two categories: The present invention is directed to two categories of oligopeptides: one in which the oligopeptide comprises at least one amino acid selected from the group of amino acids consisting of synthetic amino acids and nonprotein amino acids.

The naturally occurring (standard or normal) amino acids that have been established as protein constituents are L-alpha-amino acids (*Handbook of Chemistry and Physics*, 1999). In distinction, some 300 amino acids have been found in cells but are not substituents of proteins, and are referred to herein as "nonprotein amino acids," that is to say, nonprotein derived natural amino acids. Occurring in the free state in plant or animal tissue, or in eucaryotic or procarytoic cells, examples of nonprotein amino acids include, but are not limited to, β-alanine, γ-aminobutyric acid, N,N-dimethylglycine, creatine, glycyamine, carnosine, glycosyamine, taurine, and the D-forms of the naturally occurring, protein hydrolysis products of proteins, (Ernest Baldwin, *Dynamic Aspects of Biochemistry*, 4th ed., Cambridge at the University Press, 1963; A. Meister, *Biochemistry of the Amino Acids*, 2nd ed., Vols. 1 and 2, Academic Press, 1963; G. Zubay, *Biochemistry;* Lehninger et al., *Principles of Biochemistry* 2nd ed., Worth Publishers, 1993; Corrigan, J. J. D-Amino acids in animals, Science 169:142–148, 1969). These nonprotein amino acids number into the hundreds, and include precursors of normal amino acids, such as homoserine and diaminopimelate, intermediates in catabolic pathways, such as pipecolic acid, D-enantiomers of "normal" amino acids, and amino acid analogs, such as azetidine-2-carboxylic acid and canavanine, that might be formed by unique pathways or by modification of normal amino acid biosynthetic pathways.

It should be understood that naturally-occurring, nonprotein amino acids which comprise more than one amino acids, such as the dipeptide carnosine (n-β-alanyl-L-histidine), are referred to, depending on the context of the embodiments of the invention herein, as either an oligopeptide or an amino acid. A similar nomenclature is adopted for synthetic amino acids.

Synthetic amino acids are those which do not occur in nature. Many synthetic or non-naturally occurring amino acids can be readily synthesized and are useful for incorporation into the oligopeptides of the present invention. Specific examples are disclosed in relevant chapters from the most recent editions of *Beilstein Handbuch der Organischen Chemie*. Literature references and methods of syntheses, purification, and use for the amino acids encompassed herein are well known. Furthermore, large numbers of such compounds are readily available from many commercial sources, including Aldrich Chemical Company, St. Louis, Mo. It is understood that as used herein, the term "synthetic amino acids" does not refer to synthetically made amino acids which are mimics of naturally occurring normal amino acids (i.e. protein-derived amino acids).

In one aspect, the invention provides a composition of matter which comprises a metallic complex of formula I, as shown above. $M^{Z+}$ is a metal ion of nutritional or therapeutic value. For purposes of the invention, a metal ion has nutritional or therapeutic value when it exhibits a biological, nutritional or therapeutic activity or promotes, maintains, or supports health and tissues. Examples include but are not limited to metals which are part of a co-enzyme, for example, cobalt in vitamin B-12; activating certain biological processes, such as $Mg^{++}$ in enzymatic hydrolysis of ATP; being a structural element in certain biological polymeric matrices, for example $Ca^{++}$ in bones. These metallic ions can also show a definite therapeutic value, such as platinum compounds in the treatment of cancer, or gold compounds in treatment of rheumatoid arthritis. M can be selected from the group consisting of, but not limited to chromium, zinc, manganese, magnesium, calcium, copper, iron, cobalt, vanadium, molybdenum, germanium, selenium, and indium. Z refers to the valency or coordination number of the metal ion. With respect to selenium, it is understood that to function as a metallic nucleus in the structures of the invention, selenium would have to be in a molecular form such as selenonium or equivalent thereof. For vanadium to function as metallic nucleus in the structures of the invention, vanadium is preferably in a molecular form such as vanadyl or the equivalent. Accordingly, for purposes of synthesizing the metallic complexes of the invention, it is appreciated that the structure of the metallic complex of the invention is often predictably determined by the coordination number of the metal ion, the number and type of functional groups on the ligand(s) L and the molar ratio of ligands to each other and to $M^{Z+}$ in the starting mixture.

$L_n$ is one or more oligopeptides. Each L provides at least one nitrogen donor atom and one oxygen donor atom for complexing with the metal ion. With respect to administration to humans or other mammals, the term "nontoxic" substance means substances which are not harmful at pharmaceutical, nutrient, or therapeutic concentrations, and further includes all of the so-called GRAS substances (Generally Recognized as Safe), and, in a broader sense, any substance whose use is not excluded because of excessive carcinogenic, teratogenic and/or mutagenic properties. The toxicity of a ligand in the context of a metallic-ligand complex is determined by in vitro assays and by animal studies using protocols well known in the art (New Drug Approval Process, 2nd ed., editor Richard A. Guarino, Marcel Dekker, Inc., 1993; Guide to Clinical Trials, Bert Spilker, Ravens Press, 1991, Chap. 88, pp. 675–683, "Extrapolation of Safety (i.e. Toxicological) Data from Animal to Human)).

Oligopeptides and amino acids are polyfunctional. The functional groups attached to the peptide backbone within L include, but are not limited to, amino-, hydroxy-, mercapto-, amido-, and carboxylic groups which are capable of complexing a metal ion. The positions of these groups within the ligand should provide, as a rule, a five-, six-, or seven-membered ring with the complexed metal ion. Such spatial arrangements are particularly suitable in terms of complex stability, both in terms of low energy and high entropy of the corresponding complexes.

| | |
|---|---|
| Examples of | |
| α-amino acids useful in the invention include but are not limited to | |
| carboxylate: | glycine, L-alanine, L-histidine, D-phenylalanine, glycine, d, 1 α-amino octanoic acid |
| sulfonate: | aminomethylsulfonic acid |
| phosphonate: | aminomethylphosphonic acid |
| Examples of | |
| β-amino acids useful in the invention include, but are not limited to: | |
| carboxylate: | β-alanine, picolinic acid, anthranilic acid |
| sulfonate: | taurine, o-aminobenzenesulfonic acid |
| phosphonate: | β-aminoethylphosphonic acid |
| Examples of | |
| γ-amino acids useful in the invention include, but are not limited to: | |
| carboxylate: | γ-aminobutyric acid (GABA), m-aminobenzoic acid, nictonic acid |
| sulfonate: | γ-aminopropanesulfonic acid, pyridine-4-sulfonic acid |
| phosphonate: | γ-aminopropanephosphonic acid |
| phosphoric: | pyridoxamine phosphate |
| Examples of | |
| δ-amino acids useful in the invention include, but are not limited to: | |
| carboxylate: | δ-aminolevulinic acid, |
| sulfonate: | δ-aminobutanesulfonic acid, p-aminobenzenesulfonic acid |
| phosphonate: | δ-aminobutanephosphonic acid |

Literature references and methods of synthesis, purification, and use for the amino acids encompassed herein and for their incorporation into oligopeptides are well known, and many of these compounds are readily available from multiple commercial sources, such as Aldrich Chemical Company, St. Louis, Mo.

Synthesis of the Composition of the Invention

In accordance with the present invention, compositions of matter with the formula I are synthesized, the synthesis guided by the polyfunctionality of $L_n$, that is to say, nitrogen and oxygen donor atoms' interaction with $M^{Z+}$ in the context of the structure of $M^{Z+}L_n$.

Without limiting the scope of structures claimed herein, representative metallic complex structures of formula I for n=1, n=2 and n=3 are shown below. In these structures, it is understood that R' or R" stand for (a) residues found in protein-derived natural α-amino acids; or for (b) residues found in nonprotein natural amino acids; or for (c) residues found both in protein- and nonprotein natural amino acids; or for (d) any synthetic residue. It should be understood that the invention is not restricted to the structures presented below.

The following description of representative structures of $M^{Z+}L_n$ is based upon the three cases of n.

n=1

In $M^{Z+}L_n$ wherein n=1, L is an oligopeptide comprising two to ten amino acid residues. At least one of the amino acid residues is selected from the group consisting of nonprotein amino acids and synthetic amino acids. Another example is the tripeptide Chromium-L-Aspartyl-beta-alanyl-L-aspartate.

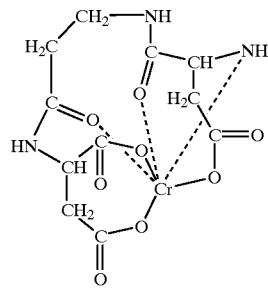

n = 1; Chromium-L-Aspartyl-beta-Alanyl-L-Aspartate

Chromium-L-Aspartyl-beta-alanyl-L-aspartate has within a single molecular structure three carboxylic groups, two peptide bonds, and one amino group (i.e. one oligopeptide ligand providing all six binding sites).

n=2

In $M^{Z+}L_n$ wherein n=2, $L_n$ comprises L1 and L2. L1 and L2 are selected independently of each other, which is to say that L1 and L2 can be the same or different with the proviso that at least one of L1 or L2 is an oligopeptide comprising at least one amino acid residue selected from the group consisting of nonprotein amino acids and synthetic amino acids, the oligopeptide comprising two to ten amino acid residues. For example, where L2 is an oligopeptide, L1 may be an amino acid residue selected from the group consisting of nonprotein amino acids, naturally-occurring protein-derived amino acids and synthetic amino acids, or L1 may be an oligomer of amino acid residues comprising naturally-occurring protein-derived amino acids. A preferred composition of the invention is a structure in which L1 and L2 are the dipeptide carnosine (i.e. Cr-bis-Carnosinate), and having the following structure:

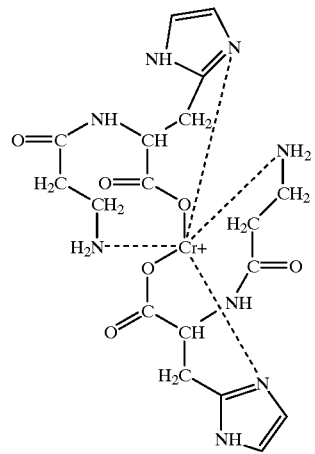

n = 2; Chromiun-bis-Carnosinate

In Chromium-bis-Carnosinate it should be noted that the two carnosine oligopeptide ligands provide six binding sites.

n=3

In $M^{Z+}L_n$ wherein n=3, $L_n$ comprises L1, L2, and L3. Where L1, L2, and L3 are oligopeptides comprising at least one amino acid residue selected from the group consisting of nonprotein amino acids and synthetic amino acids, L1, L2 and L3 are selected independently of each other, which is to say that L1, L2, and L3 can be the same or different.

Where L2 and L3 are independently selected oligopeptides, each comprising at least one amino acid residue selected from the group consisting of nonprotein amino acids and synthetic amino acids, L1 is an amino acid selected from the group consisting of nonprotein amino acids, naturally-occurring protein-derived amino acids, and synthetic amino acids. Alternatively, when L1 can be an oligomer of amino acid residues, said amino acids comprising naturally-occurring, protein-derived amino acids.

Alternatively, where L1 and L2 are each an amino acid residue, L3 is an oligopeptide comprising at least one amino acid residue selected from the group consisting of nonprotein amino acids and synthetic amino acids.

In yet another embodiment, wherein L3 is an oligomer comprising at least one amino acid residue selected from the group consisting of nonprotein amino acids and synthetic amino acids, L1 and L2 are the same or different oligomers comprising amino acid residues comprising naturally-occurring, protein derived amino acids.

An example of the structure of formula I wherein n=3 is Chromium-tris-Tauryl-beta-Alaninate.

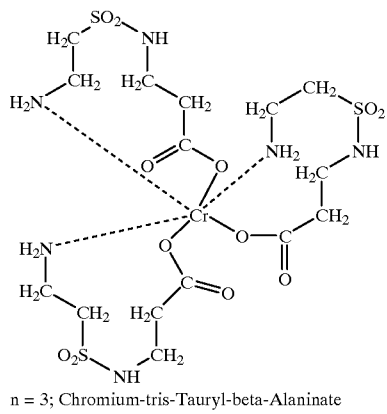

n = 3; Chromium-tris-Tauryl-beta-Alaninate

Chromium-tris-Tauryl-beta-Alaninate comprises three oligopeptide ligands of the dipeptide Tauryl-beta-Alanine, which provide six binding sites.

EXAMPLE 1

Chromium-bis-Carnosinate

In the composition of matter of formula I ($M^{Z+}L_n$) wherein n=2, a preferred composition is directed to a metallic complex comprising chromium and the dipeptide carnosine. The formula of chromium-bis-carnosinate is Cr[carnosine]$_2$. A procedure for preparing chromium-bis-carnosinate involves gradually adding during 30 minutes NaHCO$_3$ (168 mg; 2 mmoles) to a solution of chromium chloride hexahydrate (266 mg; 1 mmole) and carnosine (452 mg, 2 mmoles) in 90% methanol (20 ml) at reflux temperature. The reflux is continued for an additional 3.5 hours. The purple solution is then evaporated to dryness with a rotary evaporator in vacuum (bath temperature 60° C. The residue is triturated several times with ethanol, whereupon a heavy purple oil solidifies. After filtering and washing the solid with ethanol, the purple chromium-bis-carnosinate complex is dried in a vacuum desiccator for 24 hours. The yield is 90–95%.

The invention is further directed to the composition of formula I which further comprises a food or drink composition or a dietary supplement for supplementing a nutritional metal, or amino acid, or oligopeptide in a mammalian diet. Alternatively, the invention is directed to either a food or drink composition or to a dietary supplement for supplementing a metal, amino acid, or oligopeptide in a mammalian diet, said food or drink composition comprising a metallic complex of the formula I ($M^{Z+}L_n$). Accordingly, an object of the invention is to provide compositions of formula I which are industrially applicable in providing dietary supplementation for humans or mammals.

Compositions of formula I are formulated in "functional foods," which is taken to mean as those foods that encompass potentially healthful products including any modified food or food ingredient that provides a health benefit beyond the traditional nutrients it contains, the health benefit conferred by compositions of formula I. Further compositions of formula I are formulated into "nutraceuticals," defined as any substance that is considered a food or a part of a food which provides medical or health benefits, including the prevention and treatment of disease. Still further compositions of formula I are formulated into "medical foods," defined as special dietary foods intended for use solely under medical supervision to meet nutritional requirements in specific medical conditions (Hasler, C., Functional Foods: the Western perspective, Nutrition Reviews, 54:S60S10, 1996).

The compositions of formula I are formulated, for example but not by way of limitation, in rice food and snacks, such as popped rice, puffed rice, rice flakes, rice pudding, rice drinks, rice chips, rice snaps, rice cakes, rice crackers, rice ice cream and rice noodles. The compositions of formula I are introduced into rice products, for example, by adding them to the soaking solution prior to steaming rice in the parboiling process or by spaying them onto the rice following the steaming step in the parboiling process, and then drying the rice. Alternatively, the compositions of formula I are added to rice flours used for preparation of rice noodles, rice cakes, rice crackers, and rice pudding. These methods are described in *Rice Chemistry and Technology*, 2nd ed., edited by O. J. Bienvenido, American Association of Cereal Chemists, Inc., publ., St. Paul, Minn. The compositions of formula I are also formulated without limitation in corn chips, popcorn, and other corn products, wheat products, oat products, rye products, barley products, teas, juices, seasonings, pretzels, candies and chewing gums using formulation methods well know in food science (*Corn Chemistry and Technology*, edited by S. A. Watson and P. E. Ramstad, American Assn. Cereal Chemists, St. Paul, Minn., publ., 1987; *Wheat Chemistry and Technology*, 3rd. ed., edited by Y. Pomeranz, American Assn. Cereal Chemists, St. Paul, Minn., publ., 1988; *Oats Chemistry and Technology*, edited by F. H. Webster, American Assn. Cereal Chemists, St. Paul, Minn., publ., 1986; *Rye Production, Chemistry and Technology*, edited by W. Bushuk, American Assn. Cereal Chemists, St. Paul, Minn., publ., 1976; *Barley Chemistry and Technology*, eited by A. W. MacGregor and R. S. Bhatty, American Assn. Cereal Chemists, St. Paul, Minn., publ., 1993; *Functional Foods*, edited by G. Mazza, Technomic Publishing Co., Lancaster, Pa., 1998).

The compositions of formula I are also formulated in tablets, capsules and troches for oral administration to achieve nutritional supplementation. Tablet, capsule and troche production are described in Remington: *The Science and Practice of Pharmacy*, edited by A. R. Gennaro, Mack Publ. Co., Easton, Pa., 1995.

Still further, the compositions of formula I are formulated in meal supplements to be used as medical foods, enteral nutrition and parenteral nutrition (*The Science and Practice of Pharmacy*, op cit.).

While the invention has been described in connection with specific embodiments thereof, it will be understood that it is capable of further modification, and this application is intended to cover any variations, uses, or adaptations of the invention following, in general, the principles of the invention and including such departures of the present disclosure as come within known or customary practice in the art to which the invention pertains and as may be applied to the essential features set forth herein, and as fall within the scope of the invention and the limits of the appended claims.

What is claimed is:

1. A composition of matter comprising a metallic complex of the formula:

$$M^{Z+}L_n$$

wherein
M is a metal ion of nutritional or therapeutic value;
$L_n$ is one or more oligopeptides wherein at least one oligopeptide comprises at least one amino acid selected from the group consisting of nonprotein amino acids and synthetic amino acids, said oligopeptide comprising two to 10 amino acids;
n=1–3,
Z=1–6.

2. The composition of matter of claim 1 wherein $M^{Z+}$ is selected from the group consisting of chromium, zinc, manganese, magnesium, calcium, copper, iron, cobalt, vanadium, molybdenum, germanium, selenium, and indium.

3. The composition of matter of claim 1 wherein n=1.

4. The composition of matter of claim 3 wherein L is carnosine.

5. The composition of matter of claim 1 wherein n=2, said $L_n$ comprising $L_1$ and $L_2$.

6. The composition of matter of claim 5 wherein $L_1$ is an oligomer of amino acids, said amino acids comprising naturally-occurring protein-derived amino acids.

7. The composition of matter of claim 5 wherein $L_1$ and $L_2$ are carnosine.

8. The composition of matter of claim 5 wherein $L_1$ is an amino acid.

9. The composition of matter of claim 8 wherein $L_1$ is selected from the group consisting of nonprotein amino acids, naturally-occurring protein derived amino acids, and synthetic amino acids.

10. The composition of matter of claim 1 wherein n=3, said $L_n$ comprising $L_1$, $L_2$, and $L_3$.

11. The composition of matter of claim 10 wherein $L_1$, $L_2$, and $L_3$ are oligopeptides.

12. The composition of matter of claim 10 wherein $L_1$ is an amino acid, and $L_2$, and $L_3$ are independently selected oligopeptides.

13. The composition of matter of claim 12 wherein $L_1$ is selected from the group consisting of nonprotein amino acids, naturally-occurring protein-derived amino acids, and synthetic amino acids.

14. The composition of matter of claim 10 wherein $L_1$ is an oligomer of amino acids, said amino acids comprising naturally-occurring, protein-derived amino acids.

15. The composition of matter of claim 10 wherein $L_1$ and $L_2$ are amino acids and $L_3$ is an oligopeptide.

16. The composition of matter of claim 15 wherein $L_1$ and $L_2$ are independently selected from the from the group consisting of nonprotein amino acids, naturally-occurring protein-derived amino acids, and synthetic amino acids.

17. The composition of matter of claim 10 wherein $L_1$ and $L_2$ are the same or different oligomers of amino acids, said amino acids comprising naturally-occurring, protein-derived amino acids.

18. The composition of matter of claim 1 further comprising a food or drink composition for supplementing said metal, said amino acids, or said oligopeptides in a mammalian diet.

19. The composition of matter of claim 1 further comprising a dietary supplement for supplementing said metal, said amino acids, or said oligopeptides in a mammalian diet.

20. A food or drink composition for supplementing a metal, amino acid, or oligopeptide in a mammalian diet, said food or drink composition comprising a metallic complex of the formula:

$$M^{Z+}L_n$$

wherein
M is a metal ion of nutritional or therapeutic value;
$L_1$ is one or more oligopeptides wherein at least one oligopeptide comprises at least one amino acid selected from the group consisting of nonprotein amino acids and synthetic amino acids, said oligopeptides comprising two to ten amino acid;
n=1–3,
Z=1–6.

21. A dietary supplement for supplementing a metal, amino acid, or oligopeptide in a mammalian diet, said dietary supplement composition comprising a metallic complex of the formula:

$$M^{Z+}L_n$$

wherein
M is a metal ion of nutritional or therapeutic value;
$L_n$ is one or more oligopeptides wherein at least one oligopeptide comprises at least one amino acid selected from the group consisting of nonprotein amino acids and synthetic amino acids, said oligopeptides comprising two to ten amino acid;
n=1–3,
Z=1–6.

* * * * *